United States Patent
Lehner et al.

(10) Patent No.: US 8,144,448 B2
(45) Date of Patent: Mar. 27, 2012

(54) CONTROL UNIT COMPRISING A CLOSED-LOOP CONTROLLER FOR REGULATING THE ELECTRICAL COIL CURRENT OF A REGULATING ELECTROVALVE

(75) Inventors: Oliver Lehner, Beratzhausen (DE); Michael Robl, Ingolstadt (DE)

(73) Assignee: Continental Automotive GmbH, Hannover (DE)

( * ) Notice: Subject to any disclaimer, the term of this patent is extended or adjusted under 35 U.S.C. 154(b) by 338 days.

(21) Appl. No.: 12/293,904

(22) PCT Filed: Mar. 5, 2007

(86) PCT No.: PCT/EP2007/052036
§ 371 (c)(1),
(2), (4) Date: Dec. 16, 2008

(87) PCT Pub. No.: WO2007/107444
PCT Pub. Date: Sep. 27, 2007

(65) Prior Publication Data
US 2009/0225489 A1    Sep. 10, 2009

(30) Foreign Application Priority Data
Mar. 20, 2006   (DE) .................. 10 2006 012 657

(51) Int. Cl.
*H01H 47/00* (2006.01)
(52) U.S. Cl. .............. 361/152; 361/160; 361/168.1; 361/169.1; 137/487.5; 701/83; 251/129.15
(58) Field of Classification Search .............. 361/160, 361/152, 168.1, 169.1; 137/487.5; 701/83, 701/78; 251/129.15
See application file for complete search history.

(56) References Cited

U.S. PATENT DOCUMENTS

| 6,023,988 A * | 2/2000 | McKee et al. ............... 74/336 R |
| 2006/0011878 A1 * | 1/2006 | Denyer et al. ............ 251/129.08 |

FOREIGN PATENT DOCUMENTS

| DE | 19930965 A1 | 1/2001 |
| JP | 06281043 A | 10/1994 |
| JP | 10095321 A | 4/1998 |
| JP | 11230400 A * | 8/1999 |
| WO | 0225132 A1 | 3/2002 |

* cited by examiner

*Primary Examiner* — Patrick Salce
(74) *Attorney, Agent, or Firm* — Laurence A. Greenberg; Werner H. Stemer; Ralph E. Locher

(57) ABSTRACT

A control unit has a closed-loop controller which is connected to a regulating electrovalve by way of a feedback branch, forming a closed-loop control circuit, in order to regulate the electrical coil current of the regulating electrovalve. The armature of the electrovalve is used to adjust a desired volume flow in a motor vehicle hydraulic device. The armature of the regulating electrovalve is continuously subjected to an armature oscillation in order to reduce the static friction and/or magnetic hysteresis. Inside the closed-loop controller of the closed-loop control circuit itself, the nominal current, which is supplied to the closed-loop controller on the input side as a command variable, is subjected to a dither signal generated inside the closed-loop controller for producing the armature oscillation, essentially synchronously to the clock cycle of the closed-loop controller.

6 Claims, 3 Drawing Sheets

CONTROL UNIT COMPRISING A CLOSED-LOOP CONTROLLER FOR REGULATING THE ELECTRICAL COIL CURRENT OF A REGULATING ELECTROVALVE

BACKGROUND OF THE INVENTION

Field of the Invention

The invention relates to a control unit with a closed-loop controller which, for regulating the electrical coil current of a regulating electrovalve, of which the armature is used for adjusting a desired volume flow in a motor vehicle hydraulic device, is connected via a feedback branch to the regulating electrovalve while forming a closed-loop control circuit, with an armature oscillation being constantly applied to the armature of the electrovalve to reduce its static friction and/or magnetic hysteresis.

Hydraulically-operated brakes and clutches are typically used in automatic transmissions in motor vehicles for coupling or holding shafts. The hydraulic pressure (oil pressure) of the hydraulic fluid in these clutches and brakes is adjusted by so-called regulating electrovalves with assigned digital regulation circuits. A measuring element or a sensor is provided the feedback branch of the respective closed-loop control circuit in such cases, with the aid of which the setpoint current through the regulating electrovalve is determined and fed to the input of a digital closed-loop controller, especially a PID closed-loop controller. Because the characteristic curve field of the regulating electrovalve is known in advance the hydraulic pressure is able to be deduced from the electrical current through the regulating electrovalve. With a regulating electrovalve of the known design its armature can only be moved ad hoc into a desired position in the volume flow of the hydraulic fluid of the respective clutch or hydraulic brake because of its static friction to the inner walls of an adjustment cylinder and/or because of its magnetic hysteresis if the flow passing through the valve at least varies around a predetermined specific flow threshold value or minimum value. This must be applied in order simply to overcome the static friction and/or the magnetic hysteresis of the armature. The threshold value varies in such cases depending on different environmental parameters such as the viscosity of the hydraulic fluid or the temperature. This incorrect behavior of the armature is problematic, since despite a precisely regulated flow, the precise throughflow of hydraulic oil through the regulating electrovalve cannot be deduced and thus nor can the pressure built up in the respective hydraulic device as a result of the volume flow.

This problem has previously been addressed by an initial approach as for example in accordance with WO 02/25132 A1, by an oscillation, typically a pulse width modulation being applied after the discrete closed-loop controller of a clutch-operated system, through which the voltage across the electromagnetically-operated valve of the clutch activation system and thus the flow through the valve is determined, and thereby the armature of this regulating electrovalve is held in a constant jitter, i.e. dither movement. With the regulation method of the braking device of JP 100 95 321 A, a dither signal is also applied only to the output control signal of the closed-loop controller. In the same way, to regulate the solenoid valve of JP 06 281 043 A, a dither signal is only impressed synchronously onto the control signal after said signal is output by the closed-loop controller or controller. In a corresponding manner the output voltage of the current closed-loop controller of DE 199 30 965 A1 is first overlaid with a dither voltage. The same regulation concept is also followed for the magnetic valve of DE 10 2004 048 706 A1, where likewise the manipulated variable signal of a PID current closed-loop controller is only merged with a dither signal after being output. To avoid the closed-loop controller reacting to these dither vibrations, filtering of the measured current as a regulation variable is useful in the feedback branch of the regulation circuit. Thus for example in DE 10 2004 048 706 A1 a lowpass in the feedback branch of the regulation circuit is provided for filtering the dither frequency. A selective filter can also be connected upstream of the current closed-loop controller in order to decouple it from the dither frequency. These dither vibrations can actually be smoothed out with the aid of this type of filtration. However this makes the dither closed-loop controller far slower and the method is only suitable for high-frequency vibrations, especially for vibrations at more than 250 Hz. In practice on the other hand a change to the valve flow and thereby to the armature oscillations of the respective, specific regulating electrovalve is demanded at far lower frequency oscillations.

In accordance with a second known approach, a corresponding oscillation is applied in advance to the setpoint current as a command variable of the discrete closed-loop controller, especially PID closed-loop controller of the closed-loop controller circuit. The desired low-frequency vibrations are actually implemented with this method. However in practice fluctuations with regard to the regulating variable of the closed-loop controller are observed. These are a problem especially if the polling frequency of the PID closed-loop controller depends on environment variables such as for example the temperature, and thus the fluctuations cannot be determined exactly.

BRIEF SUMMARY OF THE INVENTION

The underlying object of the invention is to provide a control unit with a digital closed-loop controller as a component of a digital closed-loop controller circuit for further improved regulation of the electrical coil current of a regulating electrovalve used for adjusting a desired volume flow of a motor vehicle hydraulic device. This object is achieved with a control unit of the type stated at the outset by internally in the closed-loop controller of the closed-loop controller circuit the setpoint current itself which is fed to the closed-loop controller on its input side as a command variable, essentially synchronously with the clock cycle of the closed-loop controller having a dither signal generated internally by the closed-loop controller applied to it for creating the armature oscillation.

The internal application of a dither signal to the control signal or the setpoint signal of the closed-loop controller, such as a PID closed-loop controller for example, essentially synchronous with the clock cycle of the discrete or digital closed-loop controller means that fluctuations in the outgoing control signals of the closed-loop controller are largely avoided. This enables the minimum flow determined by the command variable to essentially be kept exactly to the cyclic variation of the valve flow of the regulating electrovalve, i.e. a high regulation precision can be obtained. Furthermore no other additional filters are necessary, especially in the feedback branch of the digital closed-loop controller circuit of the discrete closed-loop controller which would have a negative effect on the step response of the closed-loop controller or which could change its dynamics unfavorably. This is because the regulation variable of the feedback branch remains largely free of disruptive fluctuations which could lead to undesired incorrect regulation processes of the digital closed-loop controller. In this way lower frequencies, especially frequencies below 250 Hz, which are relevant in practice, are made possible for the armature oscillation of the regulating electrovalve.

The invention also relates to a method for regulating the electrical coil current of a regulating electrovalve, the armature of which is used for adjusting the desired volume flow in a motor vehicle hydraulic device, by means of a closed-loop controller of a closed-loop controller unit, which is connected via a feedback branch with the regulating electrovalve while forming a closed-loop controller branch, with an armature oscillation constantly being applied to the armature of the regulating electrovalve to reduce its static friction and/or magnetic hysteresis, which is characterized in that internally in the closed-loop controller of the control circuit itself the setpoint current which is fed on the input side to the closed-loop controller as a command variable has a dither signal generated internally in the closed-loop controller applied to it essentially synchronously with the clock cycle of the closed-loop controller for creating the armature oscillation.

Other developments of the invention are reflected in the subclaims.

The invention and its developments are explained in greater detail below on the basis of drawings.

DESCRIPTION OF THE INVENTION

Components with same function and method of operation are shown in FIGS. 1 through 5 with the same reference symbols in each case.

Figure 1:
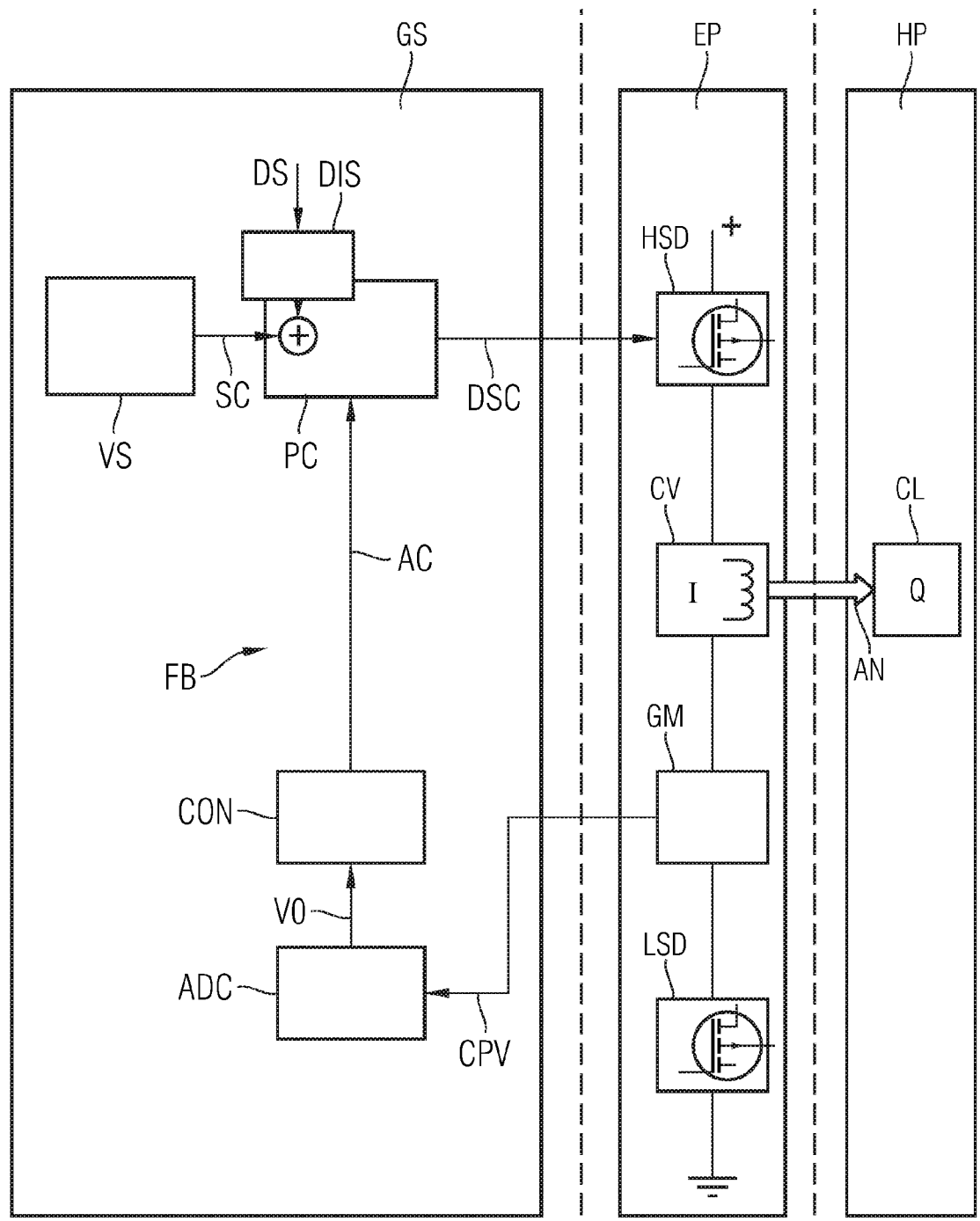
FIG. 1 a schematic diagram of a transmission control as an exemplary embodiment of an inventive control unit for regulating the electrical coil current of a regulating electrovalve, of which the armature is used to adjust a desired volume flow in a motor vehicle hydraulic device, FIG. 2 a schematic diagram of the layout of the regulating electrovalve from FIG. 1, FIG. 3 the timing curve of the setpoint current as a command variable at the input of the PID closed-loop controller of the transmission control of FIG. 1, FIG. 4 a schematic diagram of the timing curve of a dither signal, which is applied internally in the PID closed-loop controller of FIG. 1 to its setpoint current, i.e. command variable, and FIG. 5 the setpoint current resulting from the internal application in accordance with FIG. 3 as a command variable of the PID closed-loop controller of the transmission control depicted in FIG. 1.

FIG. 1 shows a schematic diagram of a typical transmission control GS as a control unit, which is used to adjust the volume flow Q of a hydraulic medium, especially hydraulic fluid, in a motor vehicle hydraulic device HP by means of an electrical adjustor or actuator EP. The transmission control is preferably embodied as an automatic transmission control. The final electrical controlling element or actuator EP has as its main component a regulating electrovalve CV. Setting said valve's coil current I, causes its armature AN to move down into an adjustment cylinder SZ (see FIG. 2) to different depths into the volume flow Q of the hydraulic device HP. The armature AN is thus merely indicated by an arrow in FIG. 1 for the sake of simplifying the drawing. In practice the hydraulic device HP is embodied by a clutch CL or by a hydraulic brake. The coil current I of the regulating electrovalve CV is assigned a specific hydraulic pressure of the volume flow Q via its characteristic curve field in the hydraulic device HP.

Figure 2:
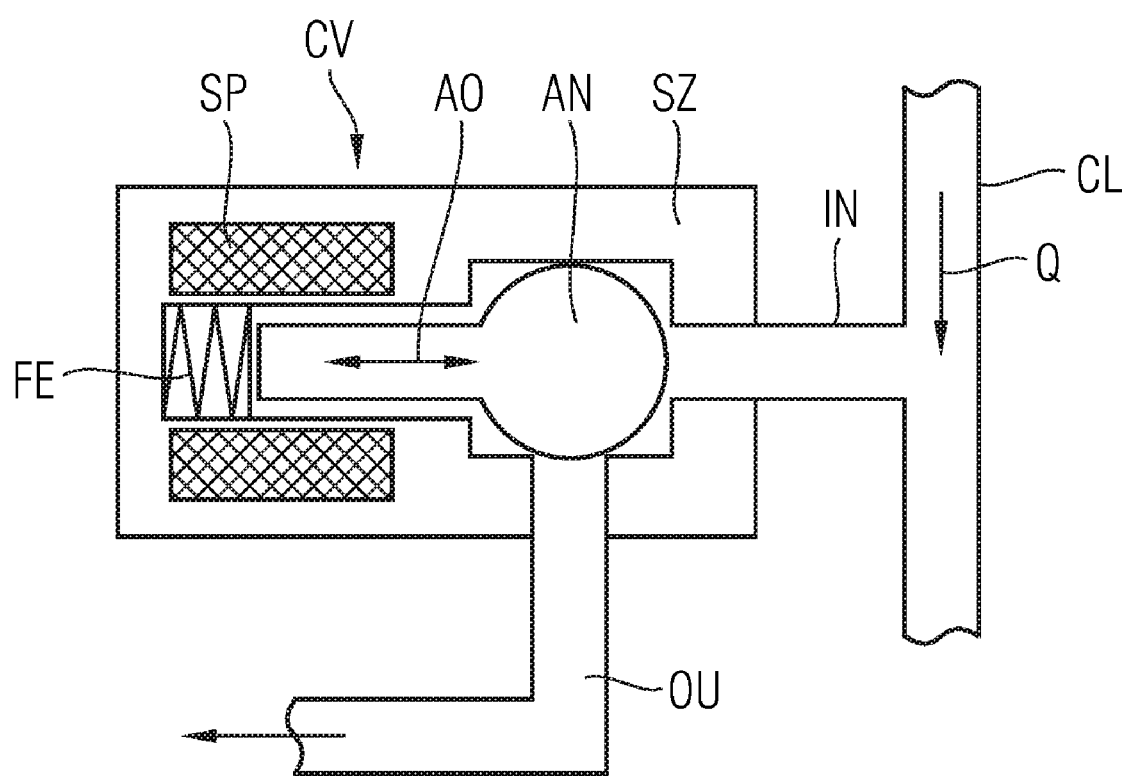

The regulating electrovalve CV is shown schematically in FIG. 2 in detail. It lets in a part of the volume flow Q of the hydraulic device HP through its inlet duct. In its rest position, its armature AN is seated over the inlet opening of an outlet duct OU and form a tight fit sealing off this opening. It can be moved by means of an electromagnetic coil SP partly or completely away from the inlet opening of this outlet duct OU so that the latter can be opened in stages. The axial actor displacement movement of the armature AN is represented in FIG. 2 by a double-ended arrow AO. The armature AN has a spherical part as its closure element at its end facing towards the outlet duct OU. At its opposite base end it is mounted on a spring element FE. This is elastically pretensioned as the armature AN moves away from the outlet duct OU. If the coil current I of the electromagnetic coil SP is switched off then the armature AN will be pushed back by the spring element FE into its rest position, in which it blocks off the outlet duct OU. Naturally the regulating electrovalve can be modified so that it is opened in the rest position of the armature and, when the coil current is switched on, moves its armature AN partly or completely over the outlet duct OU and blocks the latter in the desired manner to create a specific pressure of the volume flow.

To regulate the coil current I of the regulating electrovalve CV to a specific setpoint timing curve and to an associated pressure curve over time of the volume flow Q, the transmission control GS features a dynamic digital closed-loop controller, especially a PID closed-loop controller PC, which is connected with the regulating electrovalve CV via a feedback branch FB forming a digital regulation circuit. Arranged in the feedback branch FB is a measurement element or a sensor GM for flow measurement, which is depends on a low-potential driver stage LSD. In the exemplary embodiment here it is formed by a galvanometer which determines the respective voltage present via a specific electrical resistance as a measure for the actual current I. Subsequently the measured voltage CPV is digitized by means of an AD converter 33 ADC in the feedback branch FB. The digital voltage values VO at the output of the AD converter 33 ADC are fed to a conversion unit CON in the feedback branch FB, which converts the measured voltage values into associated actual current values AC according to Ohm's law. These discrete, measured actual current values AC are then fed to the PID closed-loop controller PC as the measured regulation variable.

A desired setpoint current curve SC is predetermined to the input side of the PID closed-loop controller PC by means of a vehicle component VS not shown in order to create a desired hydraulic pressure curve in the hydraulic device HP for the hydraulic medium there. The PID closed-loop controller PC determines from the difference between the supplied discrete actual current values AC and the discrete setpoint current values SC, which form the command variable of the closed-loop controller PC, a regulation deviation from which it derives a regulation variable DSC. The PID closed-loop controller PC passes this regulation variable DSC via a high-potential bus driver HSD to the input of the regulating electrovalve CV, in order to regulate to a specific setpoint current value SC.

In order to now be able to compensate for the static friction of the armature AN of the regulating electrovalve CV in its adjustment cylinder because of the hydraulic medium flowing there and/or any other magnetic hysteresis effects, the armature AN of the regulating electrovalve CV is kept moving with a cyclic or periodic basic oscillation. To do this its valve current I is constantly, preferably cyclically, varied, i.e. especially has a vibration oscillation applied to it. When this is done a so-called dither signal is impressed internally in the PID closed-loop controller PC onto the setpoint current SC. This application procedure is identified in FIG. 1 by a block with the reference symbol DIS at the discrete closed-loop controller PC. In order to avoid if possible undesired fluctuations or interferences in the timing curve of the regulation variable DSC, in the PID closed-loop controller PC the dither signal DS is essentially forced synchronous to the clock cycle of the discrete PID controller PC to its input side command variable SC. An oscillation is thus not applied to the command variable SC of the PID closed-loop controller PC outside the closed-loop controller but in the closed-loop controller itself, and thus congruently or synchronously to its clock cycle or polling cycle. This largely avoids fluctuations in the control signal DSC and also in the resulting regulation variable in the feedback branch.

Expressed in general terms the sampling frequency of the discrete PID closed-loop controller PC is preferably selected to be equal to or equal to multiples of the frequency of the dither signal. The sampling frequency in this case is selected especially to be equal to or greater than the frequency of the dither signal. If for example the armature AN of the regulating electrovalve CV is made to oscillate at a frequency of k Hz and a current amplitude of $\Delta A/2$ in mA, in order to keep the armature constantly moving and thus to reduce or eliminate the influence of the static friction and/or magnetic hysteresis, and if the polling frequency or sampling frequency of the PID controller PC is equal to m Hz, with m $\geq$ k, then the ratio between armature oscillation frequency k and the sampling frequency m of the PID controller PC is expediently selected as equal to n=round (m/(2k)), with round representing an operator for rounding to natural numbers N In the PID closed-loop controller PC for n cycles of the closed-loop controller the setpoint current SC is thus increased by $\Delta A/2$ mA and subsequently for n cycles of the closed-loop controller reduced by $\Delta A/2$ mA. On average the current I determined by the command variable SC is then obtained and thus the original closed-loop controller accuracy is preserved. Despite this the armature AN is kept in motion with a basic oscillation. This clock-synchronous application of an overlaid dither signal DS to the setpoint current SC is explained in greater detail with reference to FIGS. 3 to 5.

Figure 3:
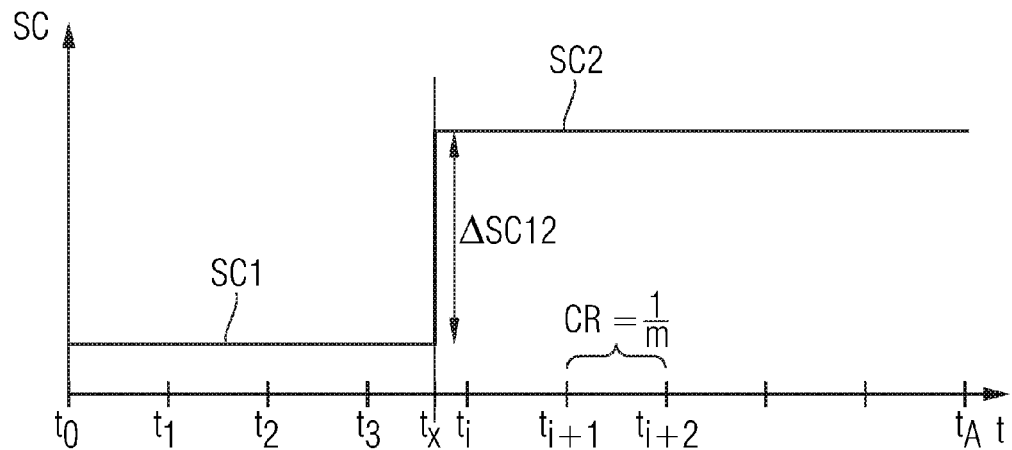
Figure 4:
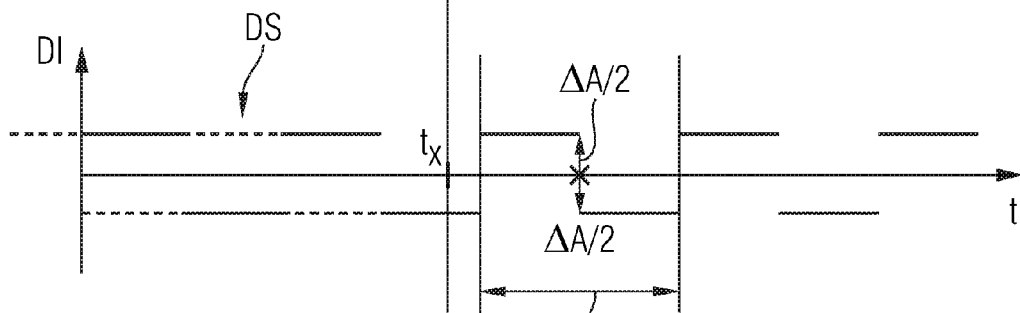

FIG. 3 shows the timing of the setpoint current SC without application of a dither signal. The time t is plotted along the abscissa, the setpoint current values SC are plotted along the ordinate. The setpoint current SC initially moves in the exemplary embodiment of FIG. 3 up to the time tx with the constant level SC1 and jumps at time tx by the value $\Delta$SC12 to the constant setpoint current level SC2. In addition the scanning times $t_0$ to $t_4$ of the discrete closed-loop controller CV are plotted along the abscissa t. For these values the period, i.e. time span CR between two adjacent sampling points such as $t_i$ and $t_{i+1}$ for example is equal to 1/m, with m being the sampling frequency of the digital closed-loop controller CV Internally in the PID closed-loop controller PC the dither signal DS is generated with the oscillation frequency k. This is illustrated schematically in FIG. 4. Once again the time t is plotted along the abscissa, the current values DI of the dither signal DS are plotted along the ordinate. The dither signal DS there switches within the period 1/k between the current amplitude values $\Delta A/2$ and $-\Delta A/2$ precisely once. The cycle time CT of this dither signal DS thus amounts to 1/k, with k being the frequency of the dither signal. In the PID closed-loop controller PC an overlaying between this dither signal DS and the setpoint current SC fed to the input is now undertaken synchronously by means of the application procedure DIS. To this end, here in the exemplary embodiment of FIGS. 3 and 4, the time for the change of the dither signal DS to a positive or negative amplitude value t $\pm\Delta A/2$ is assigned a sampling point $t_0$ to $t_4$ of the discrete controller.

Figure 5:
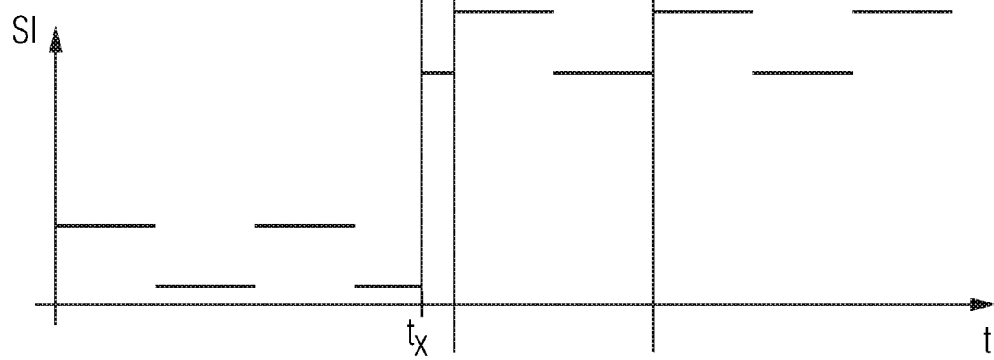

FIG. 5 shows the resulting setpoint current SI in the closed-loop controller CV to which the dither signal DS is synchronously applied, which is free of fluctuation or noise interference.

Expressed in general terms, the setpoint current SC is overlaid with an additional dither signal such that the sampling frequency of the digital closed-loop controller is equal to or equal to multiples of the frequency of the dither signal. This especially produces the following advantages: The current in the regulating electrovalve determined by the command variable will be held exactly in the middle of a period 1/k, i.e. the original regulation accuracy of the discrete closed-loop controller with the sampling frequency m largely adhered to. Fluctuations in the resulting setpoint current value from the overlaying of the command variable and the dither signal are largely avoided. This means that the armature oscillation of the armature always remains in time with the timing of the digital closed-loop controller. Furthermore no additional filters are required which can negatively influence the step response of the digital closed-loop controller. Its dynamics are thus not adversely affected. Furthermore low frequencies, which are desirable in practice, are able to be implemented for the armature oscillations. If the ratio factor n is newly determined after each period 1/k then in an advantageous manner a variable polling frequency or clock frequency m can be set for the closed-loop controller.

In the corresponding way the inventive regulation of the electrical coil current of a regulating electrovalve can also be executed for control units for other motor vehicle hydraulic devices such as hydraulic brakes for example.

The invention claimed is:

1. A control unit (GS) for regulating an electrical coil current (I) of a regulating electrovalve (CV) having an armature (AN) used to adjust a volume flow (Q) in a motor vehicle hydraulic device (HP), comprising:
 a closed-loop controller (PC) connected via a feedback branch (FB) to the regulating electrovalve (CV) for forming a closed-loop control circuit;
 said closed-loop controller (PC) operating with a clock cycle (m) and having an input receiving a command variable; and
 wherein said closed-loop controller (PC) is configured to generate an internal dither signal (DS) and to superimpose the dither signal (DS), substantially synchronously with the clock cycle (m), on a setpoint current (SC) received at said input as the command variable, to thereby create and apply to the armature (AN) of the regulating electrovalve (CV) a constant armature oscillation for reducing a static friction and/or a magnetic hysteresis thereof.

2. The control unit according to claim 1, wherein the motor vehicle hydraulic device (HP) is a clutch.

3. The control unit according to claim 1, wherein the motor vehicle hydraulic device (HP) is an hydraulic brake.

4. The control unit according to claim 1, wherein said closed-loop controller (PC) is a PID closed-loop controller.

5. A control unit (GS) for regulating an electrical coil current (I) of a regulating electrovalve (CV) having an armature (AN) used to adjust a volume flow (Q) in a motor vehicle hydraulic device (HP), comprising:

a closed-loop controller (PC) connected via a feedback branch (FB) to the regulating electrovalve (CV) for forming a closed-loop control circuit;

said closed-loop controller (PC) operating with a clock cycle (m) and having an input receiving a command variable;

wherein said closed-loop controller (PC) is configured to generate an internal dither signal (DS) and to superimpose the dither signal (DS), substantially synchronously with the clock cycle (m), on a setpoint current (SC) received at said input as the command variable, to thereby create and apply to the armature (AN) of the regulating electrovalve (CV) a constant armature oscillation for reducing a static friction and/or a magnetic hysteresis thereof; and wherein a ratio between a sampling frequency defined by the clock cycle (m) of said closed-loop controller (PC) and a frequency (k) of the dither signal (DS) is set as follows:

$$\text{round}(m/(2k))=n \in N \text{ (natural number)},$$

wherein the operator round represents rounding to a natural number, and n represents a number of regulation cycles of said closed-loop controller (PC), within which the command variable (SC) of said closed-loop controller (PC) is increased by a predetermined current amplitude ($\Delta A/2$ mA) and subsequently reduced by the predetermined current amplitude ($\Delta A/2$ mA).

6. A method for controling an electrical coil current (I) of a regulating electrovalve (CV) having an armature (AN) for adjusting a desired volume current (Q) in a motor vehicle hydraulic device (HP), the method which comprises:

providing a closed-loop controller (PC) of a control unit (GS), connected via a feedback branch (FB) to the regulating electrovalve (CV) and forming a closed-loop control branch;

receiving a command variable in the form of a setpoint current (SC) at a command input of the closed-loop controller;

generating a dither signal;

applying the dither signal to the setpoint current (SC) internally in the closed-loop controller substantially in synchronicity with a clock (m) of said closed-loop controller to generate an armature oscillation drive signal; and constantly applying to the armature (AN) of the regulating electrovalve (CV) the armature oscillation drive signal for reducing a static friction and/or a magnetic hysteresis thereof.

* * * * *